US008948455B2

(12) United States Patent
Watanabe et al.

(10) Patent No.: US 8,948,455 B2
(45) Date of Patent: Feb. 3, 2015

(54) TRAVEL PATH ESTIMATION APPARATUS AND PROGRAM

(75) Inventors: Akihiro Watanabe, Nagoya (JP); Takahiro Kojo, Gotenba (JP); Theerawat Limpibunterng, Susono (JP); Yoshiaki Tsuchiya, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 122 days.

(21) Appl. No.: 13/820,030

(22) PCT Filed: Sep. 26, 2011

(86) PCT No.: PCT/JP2011/071898
§ 371 (c)(1),
(2), (4) Date: Feb. 28, 2013

(87) PCT Pub. No.: WO2012/039496
PCT Pub. Date: Mar. 29, 2012

(65) Prior Publication Data
US 2013/0177211 A1 Jul. 11, 2013

(30) Foreign Application Priority Data
Sep. 24, 2010 (JP) ................................ 2010-214025

(51) Int. Cl.
G06K 9/00 (2006.01)
G06K 9/32 (2006.01)
G06T 7/00 (2006.01)

(52) U.S. Cl.
CPC .......... *G06K 9/3241* (2013.01); *G06K 9/00798* (2013.01); *G06T 7/0042* (2013.01); *G06T 7/0048* (2013.01); *G06T 2207/10016* (2013.01); *G06T 2207/30244* (2013.01); *G06T 2207/30256* (2013.01)
USPC ........................................................ 382/103

(58) Field of Classification Search
CPC .............. G06K 9/00798; G06K 9/3241; G06T 7/0042; G06T 7/0048; G06T 2207/30244; G06T 2207/30256; G06T 2207/10016
USPC ........................................................ 382/103
See application file for complete search history.

(56) References Cited

U.S. PATENT DOCUMENTS

| 7,265,657 | B2 * | 9/2007 | Nishida et al. ................. 340/436 |
| 7,660,436 | B2 * | 2/2010 | Chang et al. ................... 382/104 |
| 8,199,971 | B2 * | 6/2012 | Watanabe et al. .............. 382/103 |
| 8,224,031 | B2 * | 7/2012 | Saito .............................. 382/104 |
| 2002/0042668 | A1 | 4/2002 | Shirato et al. |
| 2007/0107965 | A1 | 5/2007 | Kakinami et al. |

FOREIGN PATENT DOCUMENTS

| CN | 1836267 A | 9/2006 |
| JP | A-8-261756 | 10/1996 |
| JP | A-11-23291 | 1/1999 |
| JP | A-2000-36037 | 2/2000 |
| JP | A-2002-109695 | 4/2002 |

* cited by examiner

*Primary Examiner* — Shefali Goradia
(74) *Attorney, Agent, or Firm* — Oliff PLC

(57) ABSTRACT

A characteristic point extraction section acquires an image captured by an image capture device and extracts characteristic points from the captured image, a vehicle lane boundary point selection section selects vehicle lane boundary points that indicate vehicle lanes from the extracted characteristic points, a distribution determination section determines the distribution of the vehicle lane boundary points, a system noise setting section sets each system noise based on the distribution of vehicle lane boundary points, and a travel path parameter estimation section stably predicts travel path parameters based on the vehicle lane boundary points, past estimation results, and the system noise that has been set.

6 Claims, 11 Drawing Sheets

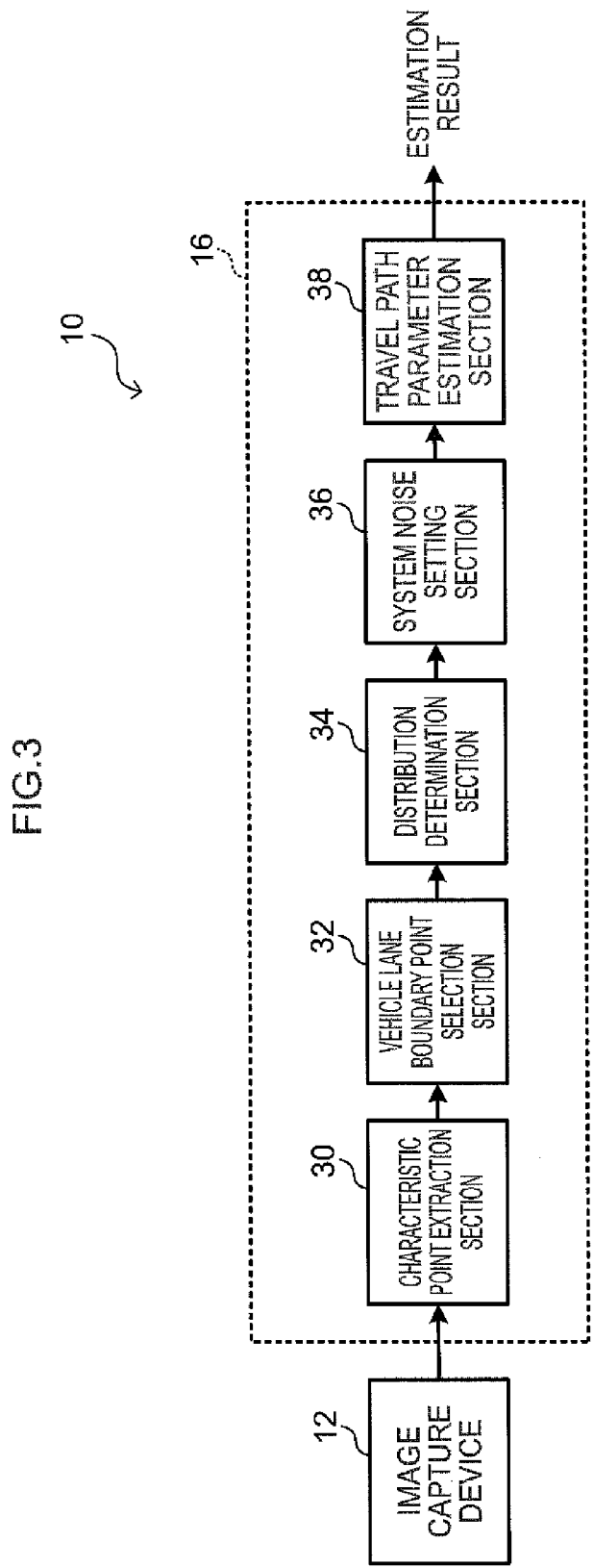

FIG.8

| | | Vehicle Lane Boundary Point Distribution (Classification of Distribution/ Pattern of Distribution) | | | | | | Comment |
|---|---|---|---|---|---|---|---|---|
| | | Far, Near, Left and Right | Only Far | Only Near | Left and Right | Only One Side | Null Observation Value | |
| | | A | F, H, N | J, L, O | B, C, D, G, K | E, H, L, M, N, O | P | |
| Travel Path Parameters Related to Position and Angle of Vehicle Itself Relative to Travel Path | Lateral Position $e_{k\|k}$ | | Low Noise | | | | | Distribution in Near Region |
| | Yaw Angle $\theta_{k\|k}$ | | | | | | Low Noise | Observation Value Present |
| | Pitch Angle $\phi_{k\|k}$ | | | | | Low Noise | Low Noise | Distribution at Left and Right |
| Travel Path Parameters Relating to Shape and Size of Travel Path | Radius Of Curvature $c_{k\|k}$ | | Low Noise | Low Noise | | | Low Noise | Distribution at Near and Far |
| | Vehicle Lane Width $w_{k\|k}$ | | Low Noise | | | Low Noise | Low Noise | Distribution at Near on Left and Right |

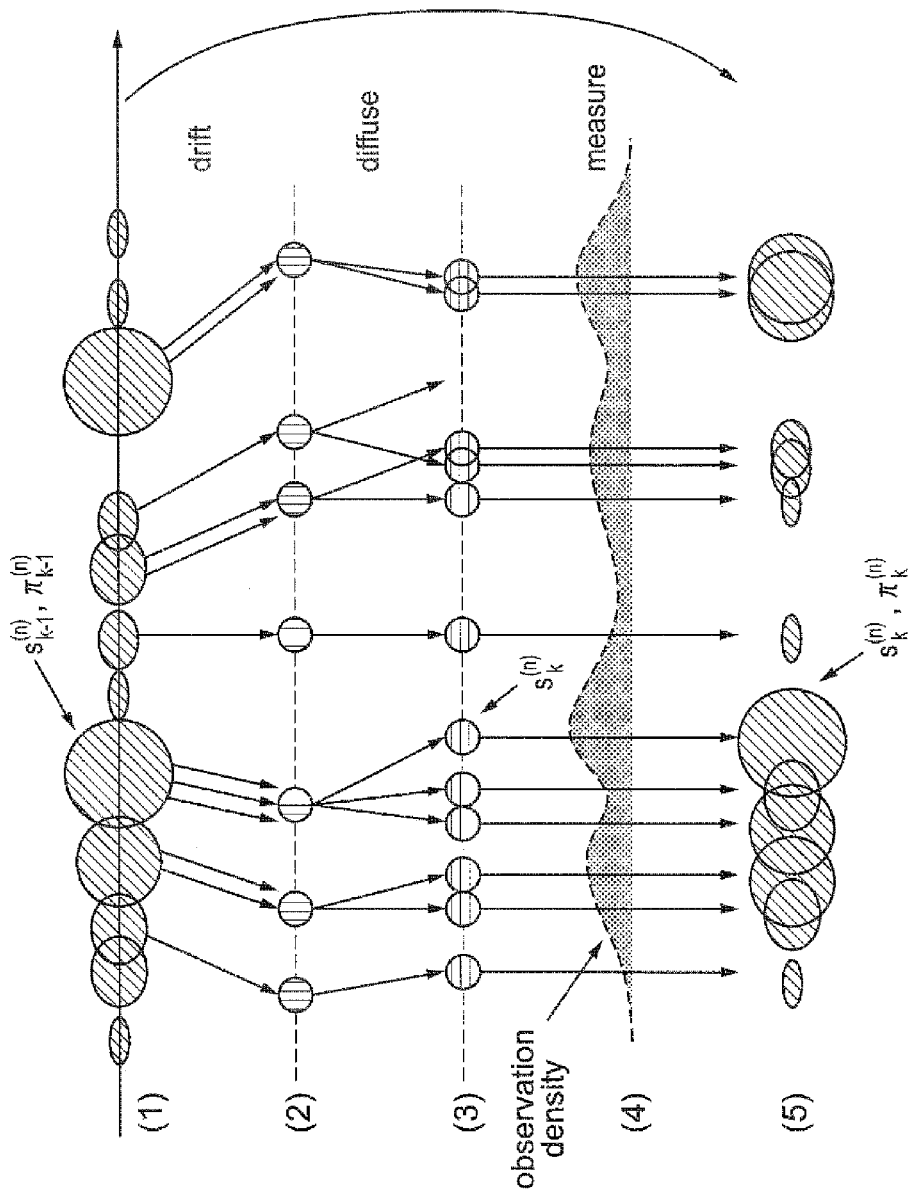

TRAVEL PATH ESTIMATION APPARATUS AND PROGRAM

TECHNICAL FIELD

The present invention relates to a travel path estimation apparatus and program, and in particular to a travel path estimation apparatus and program that estimate travel path parameters based on an image captured by an image capturing apparatus.

BACKGROUND ART

Conventionally, vehicle travel path recognition apparatuses have been proposed that detect lane markers in an input image captured in front of a vehicle by a CCD camera, and based on the results of the lane marker detection, compute road model parameters using a Kalman filter in order to represent the road shape ahead of the vehicle (see Japanese Patent Application Laid-Open (JP-A) No. 2002-109695). In the travel path recognition apparatus of JP-A No. 2002-109695, changes in the road model parameters are treated as having a probabilistic nature, and a discrete random walk model driven by fixed Gaussian white noise is defined.

DISCLOSURE OF INVENTION

Technical Problem

The estimation accuracy of each of the parameters to be estimated is affected by the distribution of the observation values, however there is a problem with the technology of JP-A No. 2002-109695 in that system noise expressing the degree of variation in the road model parameters is set irrespective of the observation values, so stable road model parameter estimation is not possible.

The present invention addresses the above problem, and an object is to provide a travel path estimation apparatus and program that can stably estimate travel path parameters.

Solution to Problem

In order to achieve the above objective, the travel path estimating apparatus of the present invention includes: an acquisition section for acquiring a captured image of a periphery of a vehicle; an extraction section for extracting, from the captured image acquired by the acquisition section, characteristic points indicating vehicle lanes; a setting section for, based on a distribution of the characteristic points extracted by the extraction section, setting system noise expressing variation of travel path parameters when estimating travel path parameters related to a position or an angle of the vehicle itself with respect to a travel path for travel by the vehicle itself and related to a shape or a size of the travel path; and an estimation section for estimating the travel path parameters by probability signal processing using a discrete time signal based on the characteristic points extracted by the extraction section, a previous estimation result of the travel path parameters, and the system noise set by the setting section.

According to the travel path estimation apparatus of the present invention, the acquisition section acquires an image that has been captured of a periphery of a vehicle, and the extraction section extracts characteristic points indicating vehicle lanes from the image acquired by the acquisition section. The extraction of the characteristic points indicating vehicle lanes is performed by firstly extracting edge points from the captured image, and then selecting the characteristic points that indicate vehicle lanes from amongst the edge points based on factors such as the shape and continuity of the edge points.

Next, the setting section sets system noise expressing variation of the travel path parameters when estimating the travel path parameters related to the position or angle of the vehicle itself with respect to a travel path for travel by the vehicle itself and the shape or size of the travel path based on a distribution of the characteristic points extracted by the extraction section. The estimation section then estimates the travel path parameters by probability signal processing using the discrete time signal based on the characteristic points extracted by the extraction section, the past estimation result of the travel path parameters, and the system noise that has been set by the setting section.

It is accordingly possible to stably estimate the travel path parameters since the system noise is set corresponding to each of the travel path parameters for estimation based on the distribution of characteristic points that indicate vehicle lanes extracted from the captured image, in other words, based on the distribution of observation values.

Configuration may be made such that the travel path parameters related to the position and the angle of the vehicle itself with respect to the travel path include a lateral position of the vehicle itself with respect to the travel path, a yaw angle with respect to a central line of the travel path and a pitch angle with respect to a plane of the travel path, and wherein the travel path parameters related to the shape and size of the travel path include a radius of curvature of the travel path and a vehicle lane width of the travel path.

Configuration may be made such that: when the characteristic points are only distributed in a far region on the captured image, the setting section lowers system noise corresponding to the radius of curvature of the travel path, the vehicle lane width of the travel path, and the lateral position of the vehicle itself with respect to the travel path; when the characteristic points are only distributed in a near region on the captured image, the setting section lowers the system noise corresponding to the radius of curvature of the travel path; when the characteristic points are in a distribution only expressing a vehicle lane left hand side boundary or only expressing a vehicle lane right hand side boundary, the setting section lowers the system noise corresponding to the vehicle lane width of the travel path and the pitch angle with respect to the plane of the travel path; and when the number of characteristic points present is the same as or less than a predetermined specific number, the setting section lowers the system noise corresponding to all of the travel path parameters.

Further, the travel path estimation program of the present invention is a program that causes a computer to perform the functions of: an acquisition section for acquiring a captured image of a periphery of a vehicle; an extraction section for extracting, from the captured image acquired by the acquisition section, characteristic points indicating vehicle lanes; a setting section for, based on a distribution of the characteristic points extracted by the extraction section, setting system noise expressing variation of travel path parameters when estimating travel path parameters related to a position or an angle of the vehicle itself with respect to a travel path for travel by the vehicle itself and related to a shape or a size of the travel path; and an estimation section for estimating the travel path parameters by probability signal processing using a discrete time signal based on the characteristic points extracted by the extraction section, a previous estimation result of the travel path parameters, and the system noise set by the setting section.

Advantageous Effects of Invention

According to a travel path estimation apparatus and program of the present invention as described above, the advantageous effect is obtained of being able to stably estimate travel path parameters, due to setting the system noise corresponding to each travel path parameter that is to be estimated based on the distribution of characteristic points that indicate vehicle lanes extracted from a captured image, namely based on the distribution of observation values.

BRIEF DESCRIPTION OF DRAWINGS

FIG. 3 is a block diagram showing a functional configuration of a travel path estimation apparatus according to an embodiment of the present invention.

FIG. 8 is a table showing an example of system noise settings for each travel path parameter according to the distribution of vehicle lane boundary points.

FIG. 10 is an explanatory diagram illustrating an example employing a particle filter.

BEST MODE FOR CARRYING OUT THE INVENTION

Detailed explanation follows regarding an exemplary embodiment of the present invention, with reference to the drawings.

Figure 1:
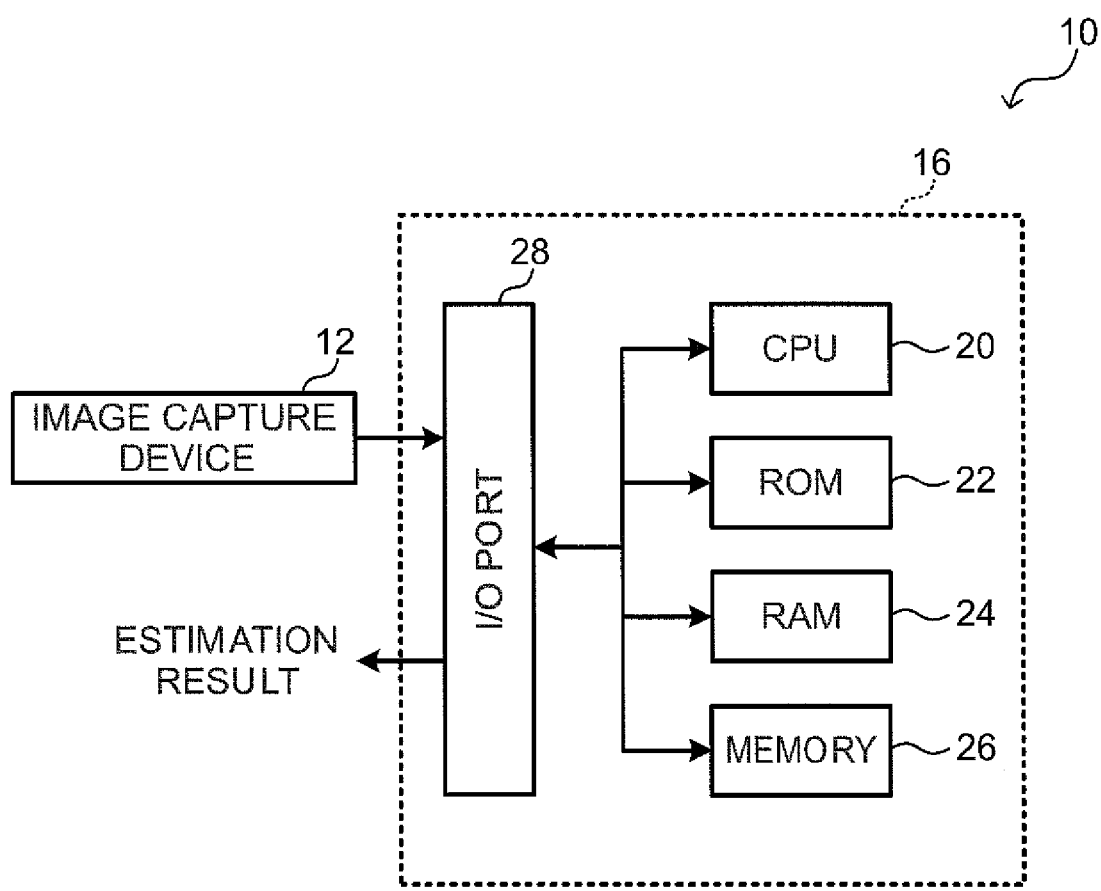
FIG. 1 is a block diagram showing relevant portions of an electrical system of a travel path estimation apparatus according to an embodiment of the present invention.

As shown in FIG. 1, a travel path estimation apparatus 10 of the present exemplary embodiment includes an image capture device 12 for successively capturing images of a region in front of a vehicle, and a computer 16 for executing processing to estimate travel path parameters.

The image capture device 12 includes an image capture section (not shown in the drawings) for capturing an image of a target region in front of a vehicle and generating an image signal, an A/D converter section (not shown in the drawings) for converting the analogue image signal generated by the image capture section into a digital signal, and an image memory (not shown in the drawings) for temporarily storing the A/D converted image signal.

The computer 16 is configured including: a CPU 20 that performs overall controls of the travel path estimation apparatus 10; ROM 22 serving as a storage medium on which various programs are stored, such as a program for a travel path estimating processing routine, described later; RAM 24 that serves as a work area for temporarily storing data; a memory 26 serving as a storage section stored with various types of data; an input-output port (I/O) port 28; and a bus that interconnects the above sections. The image capture device 12 is connected to the I/O port 28.

The travel path estimation apparatus 10 of the present exemplary embodiment extracts characteristic points indicating the vehicle lanes (vehicle lane boundary points) from images captured by the image capture device 12, and estimates travel path parameters using these characteristic points as observation values by employing a Kalman filter.

Figure 2A:
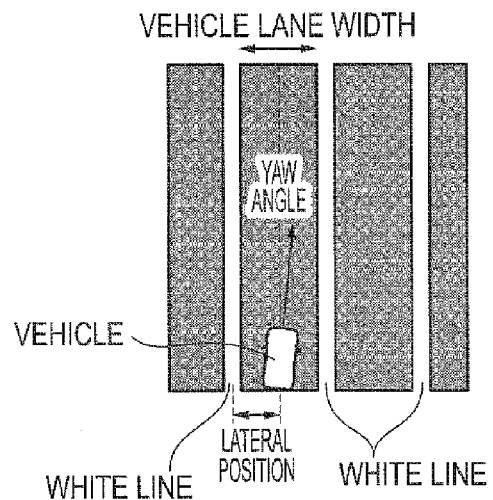
FIG. 2A is a diagram schematically illustrating travel path parameters to be estimated (lateral position, yaw angle, vehicle lane width).
Figure 2B:
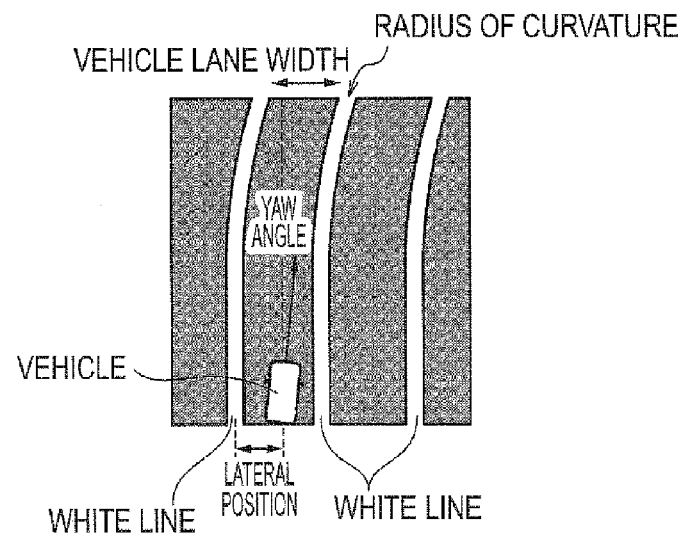
FIG. 2B is a diagram schematically illustrating travel a path parameter to be estimated (radius of curvature).
Figure 2C:
FIG. 2C is a diagram schematically illustrating a travel path parameter to be estimated (angle of pitch).

Travel path parameters relating to the position and angle of the vehicle itself relative to the travel path on which the vehicle itself is travelling, and travel path parameters relating to the shape and size of the travel path on which the vehicle itself is traveling are estimated as travel path parameters. More specifically travel path parameters relating to the position and angle of the vehicle itself relative to the travel path are taken as: a lateral position $e_{k|k}$ of the vehicle itself relative to a vehicle lane as indicated by the left hand side boundary of the travel path, a vehicle lane as indicated by the right hand side boundary, and a center line; a yaw angle $\theta_{k|k}$ relative to the center line of the travel path, and a pitch angle $\phi_{k|k}$ relative to a plane of the travel path. Travel path parameters relating to the shape and size of the travel path are taken as the radius of curvature $c_{k|k}$ of the travel path and the vehicle lane width $w_{k|k}$ of the travel path. When these 5 parameters are referred to collectively as travel path parameters they are called travel path parameters $x_{k|k}$ ($x_{k|k}=(e_{k|k}\theta_{k|k}\phi_{k|k}c_{k|k}w_{k|k})$). FIG. 2A to FIG. 2C schematically illustrate the lateral position, yaw angle, pitch angle, radius of curvature (shape of travel path) and vehicle lane width which are to be estimated as travel path parameters.

If the computer 16 for executing such processing is described in terms of functional blocks divided by each execution section for each function determined by hardware and software, as shown in FIG. 3, the computer 16 can then be represented as a configuration including: a characteristic point extraction section 30 for acquiring a captured image that was captured by the image capture device 12 and extracting characteristic points from the captured image; a vehicle lane boundary point selection section 32 for selecting vehicle lane boundary points indicating vehicle lanes from the extracted characteristic points; a distribution determination section 34 for determining the distribution of the vehicle lane boundary points; a system noise setting section 36 for setting respective system noises based on the distribution of vehicle lane boundary points; and a travel path parameter estimation section 38 for estimating the travel path parameters based on the vehicle lane boundary points, past estimation results and the system noises that have been set.

Figure 4A:
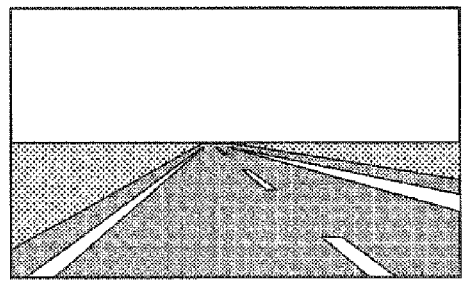
FIG. 4A is an explanatory diagram to illustrate extraction of characteristic points.
Figure 4B:
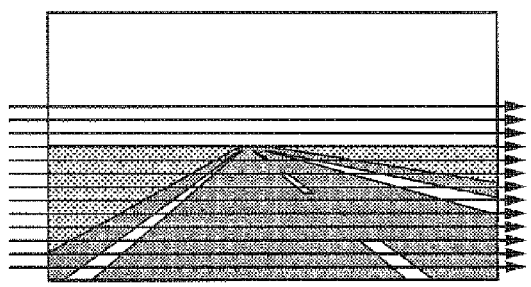
FIG. 4B is an explanatory diagram to illustrate extraction of characteristic points.
Figure 4C:
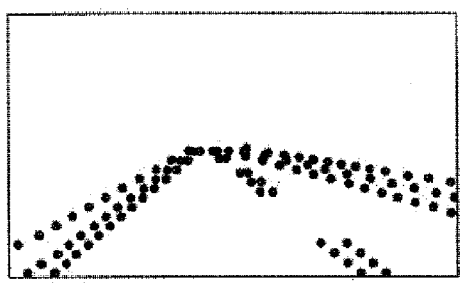
FIG. 4C is an explanatory diagram to illustrate extraction of characteristic points.

The characteristic point extraction section 30, for example, extracts as characteristic points from a captured image, such as that shown in FIG. 4A, edge points that are points where the brightness of each pixel changes on scanning in a horizontal direction, as shown in FIG. 4B. An example of extracted characteristic points is schematically illustrated in FIG. 4C.

Figure 5:
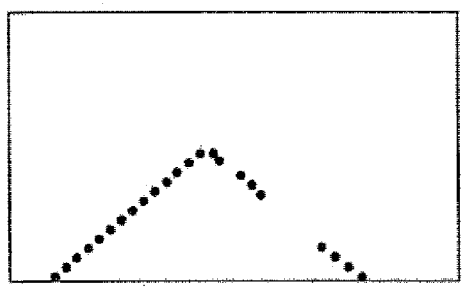
FIG. 5 is an explanatory diagram to illustrate selection of vehicle lane boundary points.

The vehicle lane boundary point selection section 32 selects from the characteristic points extracted by the characteristic point extraction section 30 vehicle lane boundary points illustrating vehicle lanes by determining such factors as the shape, width and color of edge points that are aligned in a continuous row. When there are several vehicle lanes present the vehicle lane boundary points representing the innermost left and right pair of vehicle lanes are selected. FIG. 5 schematically illustrates an example of selected vehicle lane boundary points.

The characteristic point extraction section 30 and the vehicle lane boundary point selection section 32 are examples of an extraction section of the present invention.

The distribution determination section 34 determines what sort of distribution the vehicle lane boundary points extracted by the vehicle lane boundary point selection section 32 makes. In the present exemplary embodiment determination is made as to whether the vehicle lane boundary points are distributed both in a far region and a near region, whether they are distributed only in a far region, or whether they are distributed only in a near region. Determination is also made as to whether it is a distribution in which there are both vehicle lane boundary points expressing a left hand side boundary and vehicle lane boundary points expressing a right hand side boundary present, whether it is a distribution in which only vehicle lane boundary points expressing a left hand side boundary are present, or whether it is a distribution in which only vehicle lane boundary points expressing a right hand side boundary are present. Determination is also made as to whether or not the total number of selected vehicle lane boundary points is the same as or less than a predetermined specific number. Distributions in which the total number of vehicle lane boundary points is the specific number or less are referred to as null observation value distributions.

Figure 6:
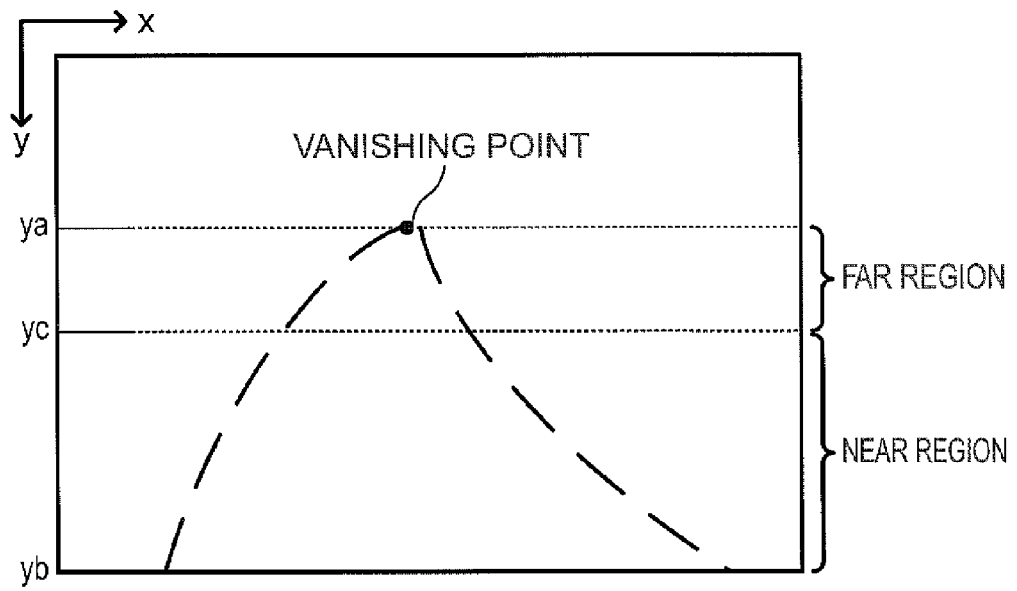
FIG. 6 is an explanatory diagram to illustrate a far region and a near region.

Explanation follows regarding the determination of whether or not there are vehicle lane boundary points present in a far region and/or a near region. First, as shown in FIG. 6, an x-axis in a horizontal direction and a y-axis in the vertical direction are determined with their origins at the pixel at the top left corner of the captured image. The position of the vanishing point is set at y coordinate ya, and the maximum value of the y coordinate of the captured image is set at yb, and a y coordinate yc is set such that yc=ya+k (yb−ya). Note that k is a value such that 0<k<1, and may, for example, be set at ⅓. Configuration may be made in which yc is set in consideration of such factors as the mounting angle of the image capture device 12 as the y coordinate on the captured image corresponding to a position that is, say, 20 m distant from the image capture device 12. A far region is then set as a range in which y coordinates are from ya to yc, and a near region is set as a range in which the y coordinates are from yc to yb.

Determination is then made as that there are vehicle lane boundary points present in a left hand side far region when the minimum value LF of the y coordinates for the vehicle lane boundary points expressing the left hand side boundary satisfies LF≤yc. Determination is made that there are vehicle lane boundary points present in a left hand side near region when the maximum value LN of the y coordinates of the vehicle lane boundary points expressing the left hand side boundary is LN>yc. Similarly, the minimum value RF and the maximum value RN the of y coordinates in the vehicle lane boundary points expressing the right hand side boundary are compared with yc to determine whether there are vehicle lane boundary points present in the right hand side far region or the right hand side near region. Note that configuration may be made in which y coordinate threshold values Tf and Tn are provided for respectively determining whether or not the vehicle lane boundary points are present in the far region or the near region. It is then determined that there are vehicle lane boundary points present in the far region when the LF (RF)≤Tf, and determined that there are vehicle lane boundary points present in the near region when the LN≥Tn.

Figure 7A:
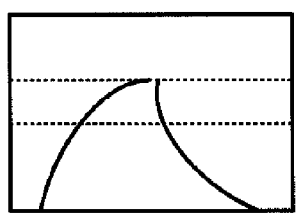
FIG. 7A is a diagram showing a distribution pattern of vehicle lane boundary points.
Figure 7B:
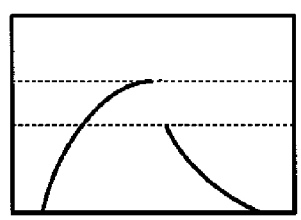
FIG. 7B is a diagram showing a distribution pattern of vehicle lane boundary points.
Figure 7C:
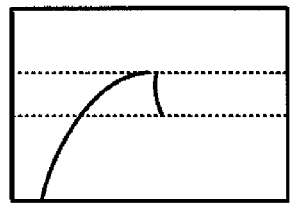
FIG. 7C is a diagram showing a distribution pattern of vehicle lane boundary points.
Figure 7D:
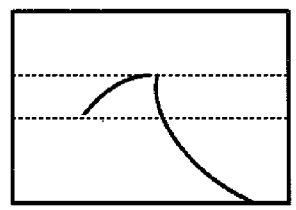
FIG. 7D is a diagram showing a distribution pattern of vehicle lane boundary points.
Figure 7E:
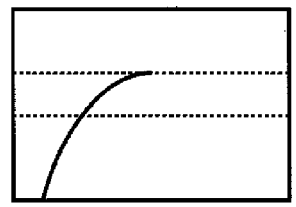
FIG. 7E is a diagram showing a distribution pattern of vehicle lane boundary points.
Figure 7F:
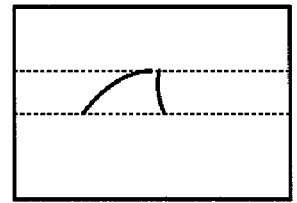
FIG. 7F is a diagram showing a distribution pattern of vehicle lane boundary points.
Figure 7G:
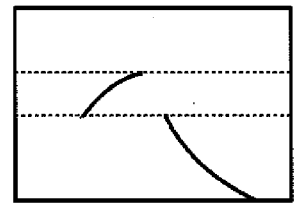
FIG. 7G is a diagram showing a distribution pattern of vehicle lane boundary points.
Figure 7H:
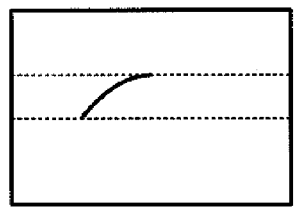
FIG. 7H is a diagram showing a distribution pattern of vehicle lane boundary points.
Figure 7I:
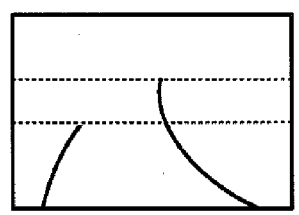
FIG. 7I is a diagram showing a distribution pattern of vehicle lane boundary points.
Figure 7J:
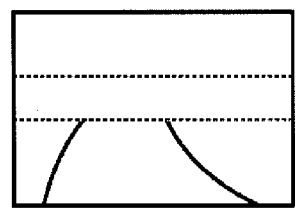
FIG. 7J is a diagram showing a distribution pattern of vehicle lane boundary points.
Figure 7K:
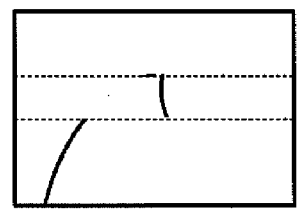
FIG. 7K is a diagram showing a distribution pattern of vehicle lane boundary points.
Figure 7L:
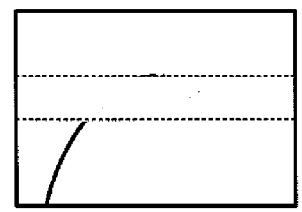
FIG. 7L is a diagram showing a distribution pattern of vehicle lane boundary points.
Figure 7M:
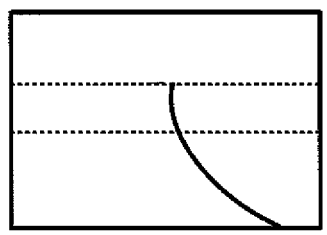
FIG. 7M is a diagram showing a distribution pattern of vehicle lane boundary points.
Figure 7N:
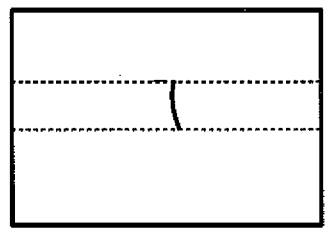
FIG. 7N is a diagram showing a distribution pattern of vehicle lane boundary points.
Figure 7O:
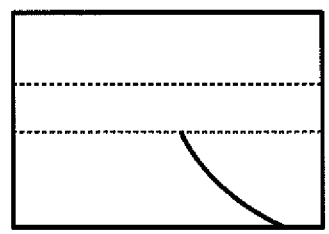
FIG. 7O is a diagram showing a distribution pattern of vehicle lane boundary points.
Figure 7P:
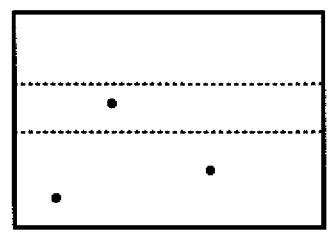
FIG. 7P is a diagram showing a distribution pattern of vehicle lane boundary points.

As described above, in order to determine whether the vehicle lane boundary points are a distribution in the far region or the near region, and whether the vehicle lane boundary points are a distribution on the left hand side or the right hand side, patterns of the distribution of the vehicle lane boundary points are categorized into patterns, such as those illustrated in FIG. 7A to FIG. 7P. FIG. 7P is a null observation value distribution.

Based on the distribution of vehicle lane boundary points determined by the distribution determination section 34, the system noise setting section 36 then sets system noise corresponding to each of the travel path parameters $x_{k|k}$ to be estimated. System noise indicates the variation in travel path parameter when a travel path parameter is estimated the current time by varying the estimation result of the previous time based on the current observation.

Stable estimation can be achieved for all the travel path parameters $x_{k|k}$ when the vehicle lane boundary points are of a distribution in both the far region and the near region, and on both the left and right hand sides. However when, for example, the vehicle lane boundary points are only distributed in the far region, estimation results become unstable due to a reduction in estimation accuracy of the travel path parameters such as the lateral position $e_{k|k}$ of the vehicle itself and the vehicle lane width $w_{k|k}$. System noise is accordingly set according to each of the travel path parameters after first determining observation conditions based on the distribution of the vehicle lane boundary points.

FIG. 8 illustrates an example of system noise setting methods. Given parameters can be comparatively stably estimated under the following conditions: the lateral position $e_{k|k}$ when the vehicle lane boundary points are distributed in the near region; the yaw angle $\theta_{k|k}$ when there are the specific number or greater of vehicle lane boundary points present (a valid observation value); the pitch angle $\phi_{k|k}$ when the vehicle lane boundary points are distributed on both the left and right hand sides; the radius of curvature $c_{k|k}$ when the vehicle lane boundary points are distributed from the near region to the far region; and the vehicle lane width $w_{k|k}$ when the vehicle lane boundary points are distributed at both the left and right hand sides of the near region. Hence, the pattern of the vehicle lane boundary point distribution determined by the distribution determination section 34 is determined by determining which out of any of the following classifications the distribution fits: "near, far, left and right" in which there are vehicle lane boundary points present in all of the regions; "only far" in which there are vehicle lane boundary points present only in the far region; "only near" in which there are vehicle lane boundary points present only in the near region; "left and right" in which there are both vehicle lane boundary points expressing a left hand side boundary and vehicle lane boundary points expressing a right hand side boundary present; "only one side" in which there are vehicle lane boundary points expressing only one side out of the left hand side boundary or the right hand side boundary present; or "null observation value" in which the total number of vehicle lane boundary points is the specific number or lower. The alphabetic codes in the bottom line of the distribution classification names of FIG. 8 correspond to the names of the respective distribution patterns of FIG. 7A to FIG. 7P. The patterns of FIG. 7A, FIG. 7F and FIG. 7J are not contained in "left and right". The patterns of FIG. 7H and FIG. 7N correspond to both "only far" and "only one side". The patterns of FIG. 7L and FIG. 7O correspond to both "only near" and "only one side".

Also, as shown in FIG. 8, a system noise setting method corresponding to each of the travel path parameters is determined separately for each of the distribution classifications. For example, for "only far" system noise corresponding to lateral position $e_{k|k}$, radius of curvature $c_{k|k}$, and vehicle lane width $w_{k|k}$ is determined to be "low noise". For "low noise" cases the system noise is set low (for example to "0"), and for cases other than "low noise" system noise is set according to a conventional method. Setting the system noise to low means making the variation small when estimating the travel path parameter, and includes a setting such that the travel path parameter in question is not refreshed. The travel path parameter is more liable to vary the greater the system noise, and as the system noise gets lower variation is less liable to occur, and stable estimation results can be obtained.

The distribution determination section 34 and the system noise setting section 36 are examples of a setting section of the present invention.

The travel path parameter estimation section 38 estimates the travel path parameters $x_{k|k}$ according to the Kalman filters shown below.

Filter Formulae $$x_{k|k} = x_{k|k-1} + K_k(y_k - h_k(x_{k|k-1})) \quad (1)$$

$$x_{k+1|k} = f_k(x_{k|k}) \quad (2)$$

Kalman Gain $$K_k = \Sigma_{k|k-1} H_k^T (H_k \Sigma_{k|k-1} H_k^T + \Sigma_{vk})^{-1} \quad (3)$$

Error Covariance Matrix Formulae $$\Sigma_{k|k} = \Sigma_{k|k-1} - K_k H_k \Sigma_{k|k-1} \quad (4)$$

$$\Sigma_{k+1|k} = F_k \Sigma_{k|k} F_k^T + G_k \Sigma_{wk} G_k^T \quad (5)$$

Initial Values $$x_{0|-1} = \bar{x}_0, \Sigma_{0|-1} = \Sigma_{x0}$$

Wherein: $x_{k|k}$ is the internal state (travel path parameter) at time k, $y_k$ is an observation value (coordinate of vehicle lane boundary points) expressed by $y_k = [y_k^1 \text{ to } y_k^m]^T$, $f_k$ is a state transition function, $h_k$ is an observation function, $F_k$ is a state transition matrix at time k, $G_k$ is a driving matrix at time k, $H_k$ is an observation matrix, $\Sigma_{k|k}$ is the estimated error covariance matrix at time k, $\Sigma_{k+1|k}$ is the predicted error covariance matrix at time k, $\Sigma_{wk}$ is a system noise covariance matrix at time k, and $\Sigma_{vk}$ is the observation noise covariance matrix at time k. The system noise set by the system noise setting section 36 is $\Sigma_{wk}$ of Equation (5). The travel path parameters $x_{k|k}$ are estimated by inserting the coordinates of the vehicle lane boundary point as the observation value $y_k$.

Figure 9:
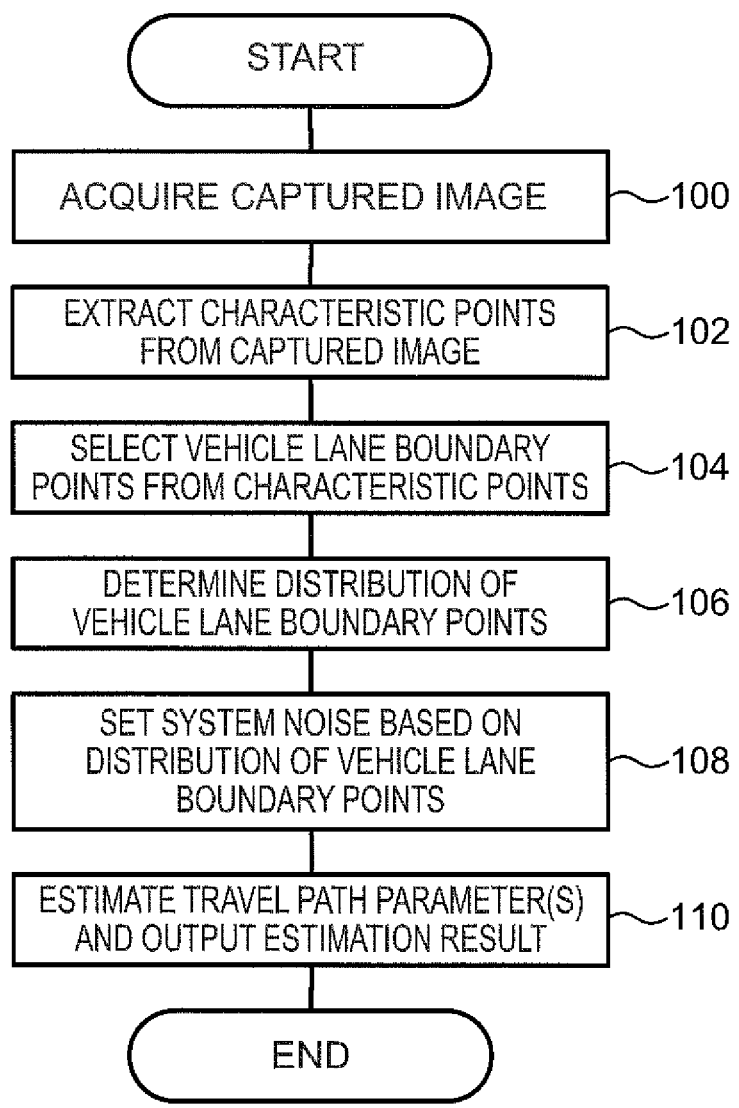
FIG. 9 is a flowchart showing contents of a travel path estimating processing routine of a travel path estimation apparatus according to an embodiment of the present invention.

Explanation follows, with reference to FIG. 9, regarding a travel path estimating processing routine executed by the computer 16 of the travel path estimation apparatus 10 according to the present exemplary embodiment. The present routine is performed by the CPU 20 executing a travel path estimation program stored on the ROM 22.

At step 100 an image that has been captured with the image capture device 12 is acquired, then at step 102 edge points that are points where there is a change in the brightness of each pixel of the captured image are extracted as characteristic points.

Then at step 104 vehicle lane boundary points indicating vehicle lanes are selected by determining from the characteristic points extracted at step 102 the shape, width and color of edge points aligned in a continuous row.

Then at step 106 determination is made of what type of distribution is adopted by the vehicle lane boundary points selected at step 104. Determination is first made as to whether or not the total number of vehicle lane boundary points is a specific number or less. When the total number of vehicle lane boundary points is the specific number or less then determination is made that the distribution is the null observation value pattern of FIG. 7P. Then if the minimum value LF of y coordinate of the vehicle lane boundary points indicating the left hand side boundary satisfies LF≤yc determination is made that there are vehicle lane boundary points present in the left hand side far region. If the maximum value LN of y coordinate of the vehicle lane boundary points indicating the left hand side boundary satisfies LN>yc then determination is made that there are vehicle lane boundary points present in the left hand side near region. Similarly, yc is compared to the minimum value RF and maximum value RN y coordinates of the vehicle lane boundary points indicating the right hand side boundary to determine whether or not there are vehicle lane boundary points present in the right hand side far region or right hand side near region. These determinations are employed to determine which of the vehicle lane boundary point patterns of FIG. 7A to FIG. 7O matches the distribution. For example, when there are vehicle lane boundary points present in all regions including the left hand side far region, the left hand side near region, the right hand side far region and the right hand side near region then the distribution is determined to be the pattern of FIG. 7A. Or when vehicle lane boundary points are only present in the left hand side far region and the right hand side far region the distribution is determined to be the pattern of FIG. 7F.

Then, at step 108, the system noise corresponding to each of the travel path parameters $x_{k|k}$ is set for estimation based on the distribution of vehicle lane boundary points determined at step 106. As shown in FIG. 8, the system noise setting that has been associated with the pattern of the vehicle lane boundary point distribution is read out with reference to predetermined associations between vehicle lane boundary points and system noises, and $\Sigma_{wk}$ of Equation (5) is set. For example, when the vehicle lane boundary point distribution is determined at step 106 to be the pattern of FIG. 7F then the classification of the distribution is "only far", and so the system noise corresponding to the travel path parameters lateral position $e_{k|k}$, radius of curvature $c_{k|k}$ and vehicle lane width $w_{k|k}$ is set low. When the vehicle lane boundary point distribution is the pattern of FIG. 7N the classification of distribution is "only far" and "only one side", and so in addition to the above travel path parameters the system noise corresponding to the yaw angle $\theta_{k|k}$ is also set low.

Then at step 110 the coordinates of the vehicle lane boundary points selected at step 104 are substituted as the observation values $y_k$ and the travel path parameters $x_{k|k}$ are estimated according to Equation (1) to Equation (5) and the estimation results output. The output estimation results can accordingly be displayed on a display device, not shown in the drawings, and employed as input data, such as for a vehicle motion control system for controlling vehicle motion.

As explained above, according to the travel path estimation apparatus of the present exemplary embodiment, based on the distribution of vehicle lane boundary points, namely the distribution of observation values, determination is made as to whether or not observation conditions are such that estimation accuracy for each of the travel path parameters should be reduced. Stable travel path parameter estimation can thereby be achieved by lowering the system noise corresponding to travel path parameters so as to reduce the estimation accuracy.

In the above exemplary embodiment explanation is given of a case in which travel path parameters are estimated using a Kalman filter, however configuration may be made in which another filter is employed based on probability (statistical) signal processing treatment of a discrete-time signal. A particle filter may, for example, be employed. In such cases, as shown in FIG. 10, (1) the probability of a travel path parameter is expressed as a size (weighting) of a particle, and (2) the travel path parameter at the next time is estimated. Such a case considers a vehicle dynamic model in which, for example, the lateral position the next time also drifts when the vehicle is at an angle with respect to the vehicle lane. Then (3) the probabilities of the travel path parameter are diffused. Diffusion is made over a wide range when there is a large variance, and diffusion is made over a narrow range when there is small variance. The width of diffusion corresponds to the system noise of the present invention. (4) Weighting is then applied using the likelihoods of the values of each travel path parameter and the observation values (vehicle lane boundary points), and (5) a probability distribution of renewed travel path parameters is then computed for the observation values.

While explanation in the present exemplary embodiment is of a case in which determination is made as to whether the distribution of the vehicle lane boundary points has points present in a far region and/or a near region, and in on the left hand side and/or the right hand side, there is no limitation to such cases. Determination of the distribution may be made on finer region divisions, determination may only be whether there are points present in the far region and/or near region, and any determination capable of determining the distribution of vehicle lane boundary lines, which are the vehicle lanes, can be employed according to the characteristics of the travel path parameters to be estimated.

A program of the present invention may be provided stored on a storage medium, or a mode may be adopted in which the program of the present invention is provided via wired or wireless communication means. There is also no limitation to implementation through a software configuration, and implementation may be made through a hardware configuration, or a combination of a software configuration and a hardware configuration.

EXPLANATION OF THE REFERENCE NUMERALS

10 TRAVEL PATH ESTIMATION APPARATUS
12 IMAGE CAPTURE DEVICE
16 COMPUTER
30 CHARACTERISTIC POINT EXTRACTION SECTION
32 VEHICLE LANE BOUNDARY POINT SELECTION SECTION
34 DISTRIBUTION DETERMINATION SECTION
36 SYSTEM NOISE SETTING SECTION
38 TRAVEL PATH PARAMETER ESTIMATION SECTION

The invention claimed is:

1. A travel path estimation apparatus comprising:
an acquisition section for acquiring a captured image of a periphery of a vehicle;
an extraction section for extracting, from the captured image acquired by the acquisition section, characteristic points indicating vehicle lanes;
a setting section for, based on a distribution of the characteristic points extracted by the extraction section, setting system noise expressing variation of travel path parameters when estimating travel path parameters related to a position or an angle of the vehicle itself with respect to a travel path for travel by the vehicle itself and related to a shape or a size of the travel path; and
an estimation section for estimating the travel path parameters by probability signal processing using a discrete time signal based on the characteristic points extracted by the extraction section, a previous estimation result of the travel path parameters, and the system noise set by the setting section.

2. The travel path estimation apparatus of claim 1, wherein the travel path parameters related to the position and the angle of the vehicle itself with respect to the travel path include a lateral position of the vehicle itself with respect to the travel path, a yaw angle with respect to a central line of the travel path and a pitch angle with respect to a plane of the travel path, and wherein the travel path parameters related to the shape and size of the travel path include a radius of curvature of the travel path and a vehicle lane width of the travel path.

3. The travel path estimation apparatus of claim 2, wherein:
when the characteristic points are only distributed in a far region on the captured image, the setting section lowers system noise corresponding to the radius of curvature of the travel path, the vehicle lane width of the travel path, and the lateral position of the vehicle itself with respect to the travel path;
when the characteristic points are only distributed in a near region on the captured image, the setting section lowers the system noise corresponding to the radius of curvature of the travel path;
when the characteristic points are in a distribution only expressing a vehicle lane left hand side boundary or only expressing a vehicle lane right hand side boundary, the setting section lowers the system noise corresponding to the vehicle lane width of the travel path and the pitch angle with respect to the plane of the travel path; and
when the number of characteristic points present is the same as or less than a predetermined specific number, the setting section lowers the system noise corresponding to all of the travel path parameters.

4. A non-transitory recording medium storing a travel path estimation program that causes a computer to function as each of the sections configuring the travel path estimation apparatus of claim 2.

5. A non-transitory recording medium storing a travel path estimation program that causes a computer to perform the functions of:
- an acquisition section for acquiring a captured image of a periphery of a vehicle;
- an extraction section for extracting, from the captured image acquired by the acquisition section, characteristic points indicating vehicle lanes;
- a setting section for, based on a distribution of the characteristic points extracted by the extraction section, setting system noise expressing variation of travel path parameters when estimating travel path parameters related to a position or an angle of the vehicle itself with respect to a travel path for travel by the vehicle itself and related to a shape or a size of the travel path; and
- an estimation section for estimating the travel path parameters by probability signal processing using a discrete time signal based on the characteristic points extracted by the extraction section, a previous estimation result of the travel path parameters, and the system noise set by the setting section.

6. A travel path estimation system, comprising:
- a memory; and
- a processor configured to:
    - acquire a captured image of a periphery of a vehicle;
    - extract, from the captured image characteristic points indicating vehicle lanes;
    - set system noise expressing variation of travel path parameters, based on a distribution of the extracted characteristic points, when estimating travel path parameters related to a position or an angle of the vehicle with respect to a travel path for travel by the vehicle and related to a shape or a size of the travel path; and
    - estimate the travel path parameters by probability signal processing using a discrete time signal based on the extracted characteristic points, a previous estimation result of the travel path parameters, and the set system noise.

* * * * *